UNITED STATES PATENT OFFICE.

HERBERT C. GORE, OF TAKOMA PARK, MARYLAND.

PROCESS OF PRODUCING A SYRUP AND A FEED.

1,310,012. Specification of Letters Patent. Patented July 15, 1919.

No Drawing. Application filed February 18, 1919. Serial No. 277,786.

*To all whom it may concern:*

Be it known that I, HERBERT C. GORE, a citizen of the United States, and an employee of the Department of Agriculture of the United States of America, residing at Takoma Park, Maryland, and whose post-office address is Department of Agriculture, Washington, D. C., have invented a new and useful Process of Producing a Syrup and a Feed.

This application is made under the act of March 3, 1883, chapter 143 (22 Stat. 625), and the invention herein described and claimed may be used by the Government of the United States, or any of its officers or employees, in the prosecution of work for the Government, and any person in the United States, without payment to me of any royalty thereon.

The object of my invention is to convert sweet potatoes with the aid of malt into a sweet potato syrup, which has consistency, taste and color similar to cane and sorghum syrups, and simultaneously to produce a by-product in the form of a feed.

In carrying out my invention, I wash sweet potatoes, remove any decayed parts or other blemishes present in the sweet potatoes, place the sweet potatoes in a kettle, add a quantity of water and boil the mixture until the sweet potatoes are thoroughly soft. From one and one half to two hours boiling is required to thoroughly soften the sweet potatoes. I then mash the boiled potatoes, add a sufficient quantity of water to form a thick, smooth, mushy liquid and bring the temperature of the mixture to 140° F., whereupon I add a quantity of ground malt equal to 3½ per cent. of the weight of the original sweet potatoes. This mixture is thoroughly stirred and allowed to stand for a few minutes at a temperature of 140° F., and the temperature thereof is then brought, with constant stirring, to 150° F., the source of heat removed and the mass allowed to stand, with occasional stirring, for about an hour. This mixture, known technically as the "mash" is now pressed in cloths to separate the liquid from the solid portions. One method of accomplishing this separation is by placing the mixture in cloth bags which are then closed, and the bags subjected to gentle pressure while kneading.

On a large scale an ordinary cider press, using racks and cloths, can be successfully employed in separating the liquid from the pulp. The liquor obtained is slightly sweet and rather turbid. Plenty of water should be used in order to produce a mash from which the liquor will freely flow and in which a large proportion of the sugars may be easily removed by a single pressing. The total quantity of water used should be two or three times the weight of the potatoes. The sweet potato syrup can be boiled down to as thick a consistency as desired. The juice flows out readily, leaving the pulp behind. The pulp can be dried and used for feed, or it can be fed while fresh.

Having thus described my invention, I claim:

A process of making a syrup consisting in adding water to sweet potatoes, boiling the mass, adding ground malt, the further boiling of this mixture, and subsequently separating the liquid portion of the mixture from the solid portion thereof, the said liquid portion being adapted for use as a syrup.

In testimony whereof, I affix my signature in the presence of two subscribing witnesses.

HERBERT C. GORE.

Witnesses:
  HAZEL NORDEMAN,
  WM. W. DENTON.